Jan. 7, 1941.  F. KOPPELMANN  2,227,937
ALTERNATING CURRENT CONVERTER
Filed March 10, 1937   3 Sheets-Sheet 1

Floris Koppelmann
Inventor
by Knight
Attys.

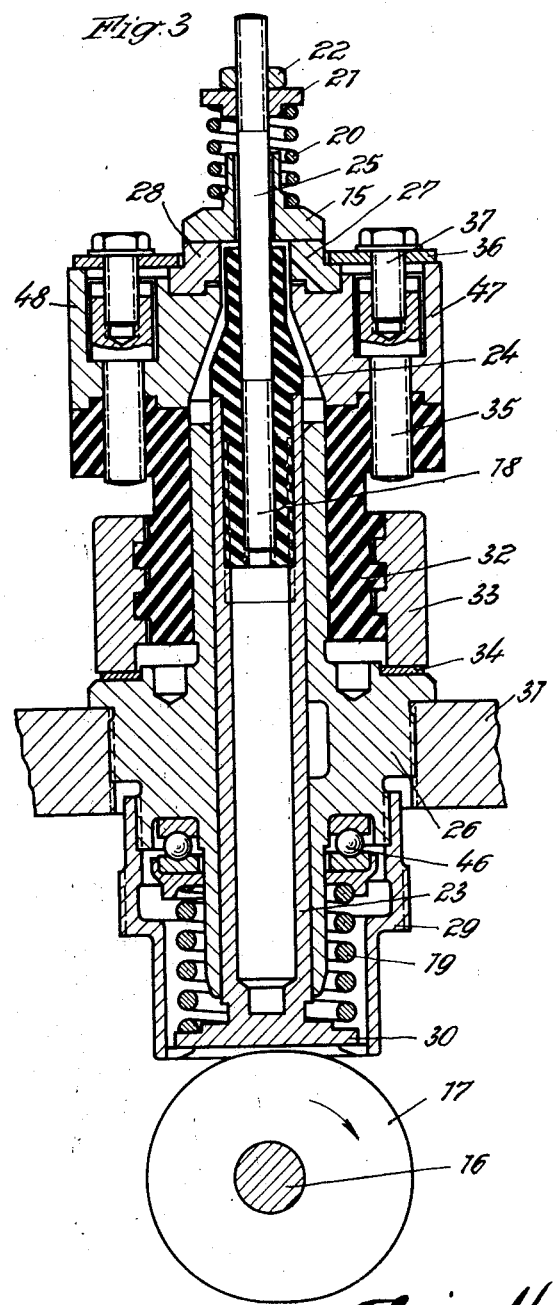

Jan. 7, 1941.  F. KOPPELMANN  2,227,937
ALTERNATING CURRENT CONVERTER
Filed March 10, 1937  3 Sheets-Sheet 3
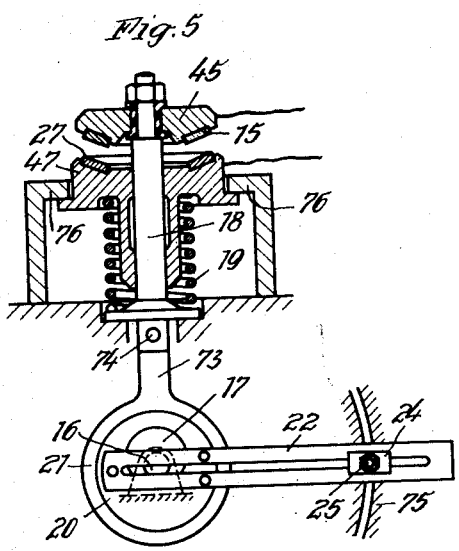
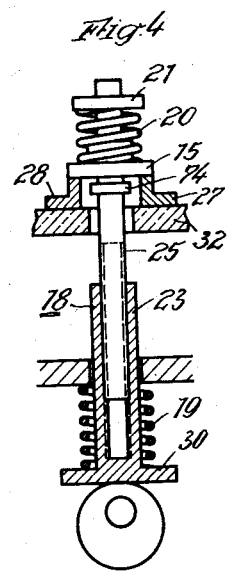
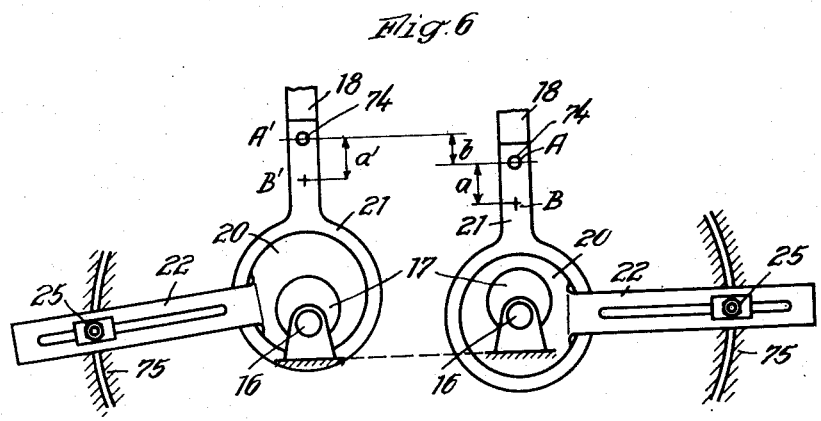

Patented Jan. 7, 1941

2,227,937

UNITED STATES PATENT OFFICE 2,227,937

ALTERNATING CURRENT CONVERTER

Floris Koppelmann, Berlin-Siemensstadt, Germany, assignor to Siemens-Schuckertwerke Aktiengesellschaft, Berlin-Siemensstadt, Germany, a corporation of Germany Application March 10, 1937, Serial No. 129,987
In Germany March 13, 1936

17 Claims. (Cl. 175—364)

My invention relates to improvements and apparatus for periodically interrupting alternating current for the purpose of rectifying alternating current, of converting direct current into alternating current and of converting alternating current of one frequency into alternating current of another frequency. More particularly my invention refers to switching gears whose circuit breakers are provided with pressure contacts, one of which is stationary while the other is actuated in synchronism with the cycle of the alternating current to be interrupted, for instance, with the aid of a synchronous motor. Such switching gears are described in my copending applications Serial No. 114,965, filed December 9, 1936, Serial No. 122,232, filed January 25, 1937.

An object of my invention is to provide mechanical means, whereby the switching gears of the above-indicated character may be so controlled that they may be readily adapted to the different operating conditions.

Another object of my invention is to provide mechanical means in the above-mentioned switching gears for the periodical interruption of alternating current, whereby the power, the intensity of current or the voltage transmitted by the circuit breakers of the interrupting apparatus may be controlled.

A still further object of my invention is to design converter devices, particularly polyphase rectifiers in such a manner that at different loads the commutation conditions most favorable for the load under consideration are automatically maintained constant by mechanical means.

According to my invention, the circuit breakers of the above-mentioned switching gears are designed as follows:

The circuit breakers of an interrupting device comprise a movable contact which is reciprocated by a driving device; for instance, by a shaft provided with eccentrics or cams and by a motor coupled with the shaft. The means employed in the drive are so designed according to the invention that the maximal path by which the drive may move the movable contact is adjustable with respect to the stationary contact. By such an adjustment the time is varied during which the movable contact and the stationary contact are closed.

Figure 1:
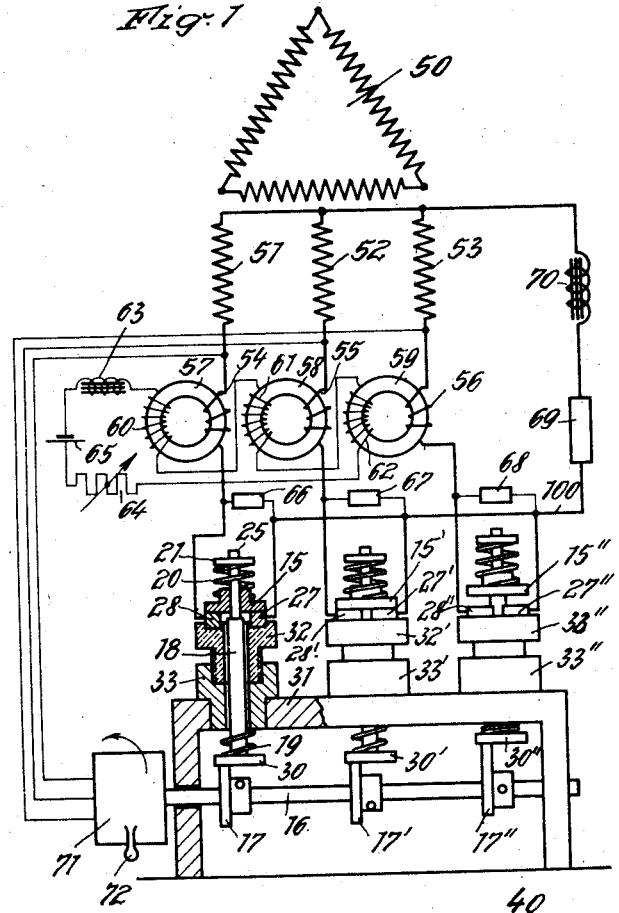
Figure 2:
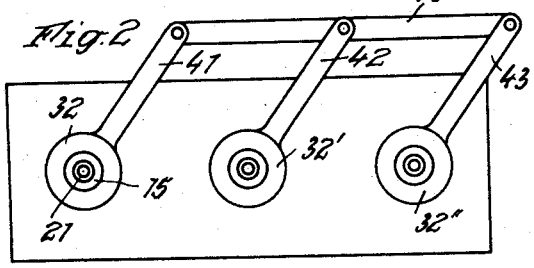

In the accompanying drawings, Fig. 1 shows a diagrammatic view of a switching gear according to my invention as well as of the corresponding wiring for rectifying three-phase alternating current. Fig. 2 shows a top view of the switching gear shown in Fig. 1. Fig. 3 shows a longitudinal sectional view of a circuit breaker of the same switching gear. Fig. 4 shows a modified form of the circuit breaker shown in Fig. 3. Fig. 5 shows another modification of the circuit breaker. Two operating positions of the circuit breaker shown in Fig. 5 are indicated in Fig. 6.

The arrangement shown in Fig. 1 serves to rectify three-phase alternating current. The mechanical elements of the breaker are arranged on a common carrier or frame 31. 50 denotes the primary side of a transformer, 51, 52 and 53 the secondary windings thereof. Each secondary winding is connected to a contact 28, 28', 28" through the winding 54, 55, 56 of three reactors. The magnet bodies 57, 58, 59 respectively of the reactors are so dimensioned that they are saturated upon exceeding a certain small intensity of current. If the current intensity falls below this value, the inductive resistance of the reactor increases considerably. Thereby the current curve is distorted and the intensity of current is reduced extensively. This action takes place during time interval recurring periodically, within which the current is interrupted by the contact device connected with the reactor. Each reactor further contains a second winding 60, 61 and 62 respectively. The second windings are series connected in a circuit containing an inductance 63, a variable resistance 64, and an auxiliary current source 65. The windings 60, 61 and 62, depending upon the adjustment of the resistance 64, effect a magnetic bias on cores 57, 58 and 59, and thus allow controlling the intensity value at which the distortion or flattening of the current in the main windings 54, 55 and 56 occurs. Consequently, the current flowing through the opening contacts is very small so that the occurrence of an arc may be avoided.

Each circuit breaker is further provided with a second stationary contact 27, 27' and 27" respectively, and with a movable contact 15, 15' and 15" respectively. The movable contact, when in closing position, bridges both stationary contacts of each breaker. The stationary contacts are electrically connected to one another and to the direct-current circuit 100. In the direct-current circuit is inserted a load 69 as well as a reactance coil 70. Impedances 66, 67 and 68 respectively are connected in parallel relation to each contact break. Each of these impedances includes a capacitor and serves to reduce the operating voltage recurring between the contacts in the initial period beginning at the moment when the contacts are opened so that arcing and backfires are avoided.

The operation of the series-connected reactors and the parallel-connected impedances is described more in detail in the above-mentioned copending applications. As far as the present invention is concerned, it suffices to mention that, due to he above-described reactors and parallel impedances, a weak current interval occurs periodically within which interval especially favorable conditions for interrupting the circuit prevail. It is therefore necessary to operate the circuit breakers in such a way that they maintain a proper inphase position with respect to these weak current intervals. The means for obtaining such operation are described in the following paragraph.

The movable contact is actuated through a cam 17 by means of a tappet 18 which is movable in the axial direction. The cams of the three circuit breakers are arranged on a common shaft 16 which is driven by a synchronous motor 71 connected to the secondary windings 51, 52, 53 of the transformer. The casing of the synchronous motor is capable of being rotated simultaneously with the stator windings by means of the handle 72. By rotating the casing, the position of phase of the cams 17, 17' and 17" and, therefore, also the moment at which the contacts are opened and closed may be adjusted with respect to the cycle of the alternating-current voltage so as to be in proper relation to the aforementioned weak current intervals.

The stationary contacts of the circuit breakers, for instance, the contacts 27 and 28, are arranged on an insulating body 32. This insulating body is screwed in a base 33. By screwing in and out this insulating body 32 the position of the stationary contacts 27 and 28 may be shifted relatively to the path along which the tappet 18 is reciprocated.

The insulating bodies 32, 32' and 32" are rotated, as will be seen from Fig. 2, by an arm 41, 42 and 43 respectively arranged on each body. The three arms are connected with one another by a rod 40. The stationary contacts of the three circuit breakers may be, consequently, raised and lowered at the same time relatively to the movement of the tappet 18. This raising or lowering may be performed by hand or automatically in accordance with a control device. The control device may be provided, for instance, with an electromagnetic drive which is connected to the direct-current circuit 100 and which is, therefore, dependent upon the current flowing in this direct-current circuit.

Fig. 3 shows a vertical sectional view of one of the circuit breakers employed in the arrangement according to Figs. 1 and 2. The constructional details of these circuit breakers which are also shown in Figs. 1 and 2 are denoted by the same numerals of reference. Accordingly, the stationary contacts are denoted by 27 and 28, the movable contact by 15, the cam shaft by 16, the cam by 17 and the tappet by the numeral 18. 19 is a spring which presses the tappet against the cam. It is advantageous to give the curve of the cam 17 such a shape that the tappet moves sinusoidally.

The tappet is designed as a separate part. It, therefore, establishes a rigid connection between the controlling cam 17 and the controlled movable contact 15 only in the direction of break and thus imparts to the movable contact a positive and constrained motion only in the upward direction. A spring 20 which presses against a plate ring 21 secured to the tappet by means of a nut 22 is provided for elastically coupling the movable contact with the tappet. The tappet 18 itself consists of three parts: a sliding tube 23, the tappet member 24 proper made of insulating material and a bolt 25 passing through the movable contact 15. The three parts 23, 24, 25 are associated with one another by threaded portions thereof. The metal parts consist preferably of light metal in order to reduce the mass; for the same reason the part 23 is designed as a tube, which slides in the stationary body 26. The spring 19 acts on the bearing body 26 through a ball bearing 46 so that the tappet may also carry out a rotation which is effected by the eccentric engagement of the cam 17 with the tappet base surface and which contributes to bring about a uniform wear of the tappet. The spring 19 and the ball bearing 46 are enclosed in a cap 29 screwed on the bearing body 26 whose collar 29 constitutes the stop for limiting the stroke of the tappet. The bearing body 26 is screwed in a plate 31. The plate 31 forms part of the common carrying body or frame (see Fig. 1) of the device and may at the same time be constructed to form part of a casing which surrounds the contact device and serves to render possible the use of a circulating arc quenching medium. The support 32 for the stationary contacts 47 and 48 is mounted on the bearing body 26. The support 32 is made preferably of insulating material in order not to transmit the voltage to the cam shaft or casing. The support 32 slides with a slight friction on the bearing body 26. The contact support 32 is provided exteriorly thereof with a strong thread engaging the counter-thread in a nut 33 which is mounted on an intermediate ring 34 placed on the bearing body 26. The stationary contacts 47 and 48 are secured on the support 32 by means of screws 35 and have separate inserts 27 and 28 which constitute the contact-making parts proper. They are inserted in a circular groove and are held by means of an insulating ring 36 and screws 37.

The device operates as follows: The control shaft 16 is driven in synchronism with the frequency of the alternating current by the motor 71. The cam 17 raises the tappet 18 which at first moves without actuating the movable contact 15 until the insulating part 24 strikes the contact 15. From this moment on, a rigid connection is temporarily established between cam 17 and contact 15 so that contact 15 is moved in the upward direction by a positive and constrained motion. The contacts now open. They close again when the cam rotates a further amount and the tappet 18 by the action of spring 19 moves in a downward direction. By turning the nut 32 with the aid of the arm 41 (Fig. 2) the position of the stationary contacts 27 and 28 is varied. If these contacts are moved in the downward direction the time interval during which the tappet 18 and the contact 15 come into engagement, is lengthened. By raising the stationary contacts, this time interval is shortened. The adjustment may be so effected that the contacts 27 and 28 come no longer into contact with contact 15. This is the case if, in the position of the cam 17 shown in Fig. 3, the contact surfaces of the inserts 27 and 28 are already below the upper edge of the tappet member 24. The stationary contacts are then completely open and the electric discharge device is, therefore, put out of operation. The adjustment of the stationary contacts in the upward direction may be effected to such an extent that the upper edge also in the raised position reaches no longer the movable contact 15. The contacts remain then closed. All intermediate positions between both end positions are capable of being continuously adjusted. The electric discharge device normally operates in an intermediate position. In this case, the stroke of the contact 14 is smaller than that of the tappet 18 and of the cam 17 respectively. Consequently, the tappet 18 is already in movement at the moment at which it comes into engagement with the movable contact 15. The contacts are, consequently, opened instantaneously with a great initial speed and under the influence of the mass of the tappet already accelerated. Also the contacts are rapidly closed, i. e., a speed, which uniformly decreases to the zero value, is avoided. The mass of the movable contact 15 possesses, therefore, at the moment of its closure still a considerable kinetic energy. The latter increases the contact pressure in the first moment and eliminates by deforming projecting particles disturbances to be feared with slowly closing contacts.

The last-mentioned advantage can also be attained in a contact arrangement of a different kind. Fig. 4 shows, as example, a contact arrangement in which the stationary contacts 27 and 28 are not capable of being adjusted with respect to their insulating support 32, whereas in this case the length of the tappet 18 is adjustable. To this end, the parts 23 and 32 are provided with threaded portions cooperating with one another. The contact 15 is movable with respect to the tappet stem 25 and is moved in the upward direction by a collar 74. If the tappet stem 25 is screwed down close to the bottom of the bore of the tube 23, the tappet 18 must move a distance before the collar 74 strikes the contact 15. In this case, the contacts are closed for a rather long time. If, however, the stem 25 is screwed in the tube 23 only a short distance, the collar 74 strikes the contact 15 at an earlier moment upon the upward movement of the tappet, 18, so that the contacts are closed for a short time. Also in this form of invention it is essential that the distance along which the movable contact moves be shorter than the distance which the driving member 18 traverses.

In the form of the invention shown in Fig. 5, an eccentric surrounded by a disc which has an eccentric hole and is rotatably mounted on the tappet, is employed for actuating the circuit breaker. By rotating this disc the distance of the movable contact from the actuating eccentric can be continuously varied and the path along which the tappet reciprocates may be displaced in the upward or downward direction.

In Fig. 5, the movable contact is designated as in the preceding figures by the numeral of reference 15. It is driven by a fixedly mounted shaft 16 to which an eccentric 17 is firmly secured. The eccentric 17 is surrounded by a disc 20. An arm 22 is secured to this disc. In the slot 23 of the arm 22, a slide block 24 is slidably arranged which is ratatable about a pivot 25. The pivot 25 is during operation firmly held in position in a stantionary guide 75.

In operation, the arm 22 oscillates about the pivot 25 and the arm 22 is radially displaced with respect to the pivot 25.

The disc 20 is surrounded by an eye 21 of a rod 73 which is hinged to the tappet 18 by a pivot 74. The movable contact 15 is insulatedly arranged on the tappet 18 and more precisely placed in a recess provided in a metal piece 45. The stationary contact 27 is placed on a contact body 47. The current supply to the contact bodies bodies 45 and 47 is effected by means of flexible leads.

The tappet 18 extends through the contact body 47. The tappet may be surrounded by an insulating tube or may be insulated from the drive mechanism by an insulating intermediate piece. The contact body 47 is pressed against a stantionary stop 76 by a spring 19.

When the shaft 16 and, therefore, the eccentric 17 is rotated, the disc 20 carries out a reciprocating movement, so that the arm 22 oscillates about the fixed pivot 25. The eye 21 as well as the tappet 18 and the movable contact parts 45 and 15 are thereby reciprocated. The distance along which the tappet 18 reciprocates corresponds to the eccentricity of the eccentric 17.

When the pivot 25 is displaced in the guide 78, the path along which the tappet 18 reciprocates is thereby displaced in the upward or downward direction as will be seen from Fig. 6.

In Fig. 6 is shown at the right hand the same operating position of the arm 22 as in Fig. 5. The part of the mechanism at the left side differs from Fig. 5 only by the fact that the arm 22 and, therefore, also the disc 20 secured thereto are rotated at about 180°. The pivot 25 is also in this position fixed in the guide 75.

As will be apparent, the eye 21 and, therefore, the tappet 18 and the contact 45, 15 are raised by rotating the disc 20 without varying the position of the driving shaft and of the eccentric 17. In the position of the arm 22 shown at the right, the pivot 74 moves in operation from A to B by a distance $a$. In the position shown at the left, the pivot 74 moves between A' and B' by the same distance $a'$. Both distances $a$ and $a'$ are, however, displaced with respect to each other by a distance $b$. If the position of the arm 22 shown at the left is chosen, the movable contact moves in the upward direction away from the stationary contact by the greatest attainable difference. In this case, the contacts are, therefore, closed a short time or not at all. If the adjustment of the arm 22 as shown at the right is chosen, the movable contact moves away from the stationary contact 47 by the smallest attainable distance and the contacts are closed for a longer time. Between both extreme positions of the arm 22 many intermediate positions are possible. It is, therefore, possible to adjust the time intervals of each cycle of the alternating-current voltage during which the contacts are closed.

If the arrangement according to Figs. 5 and 6 is so designed that the pivot 25 can also be radially displaced with respect to the arm 22, i. e., if the pivot can be moved close to the shaft 16, also the length of the distance by which the tappet 18 is raised may be somewhat varied by this adjustment.

The invention may not only be used in connection with rectifiers but also with inverters, static frequency changers and other switching gears by means of which periodically actuated break contacts are influenced so as to vary the moment at which the contacts are closed and opened or the time during which the contacts are closed. In this case, the control may be effected by hand or by automatic devices which operate in response to any variable control magnitudes, for instance, in response to the load of the switching gear. In devices for synchronously interrupting alternating current it is often of advantage to provide in combination with the described arrangement also a device by means of which the moments at which the contacts are closed and opened may be shifted at will with respect to the cycle of the alternating current. To this end, a synchronous motor with a revalvable motor casing is employed as in the arrangement shown in Fig. 1, or the control of the position of the phase may be effected by employing a phase advancer or a regulating transformer in the circuit of the synchronous motor.

The above-described arrangements are not only suitable for interrupting feeble current, but also for interrupting heavy current. For instance, if the switching gear to be employed is designed in a suitable manner, currents of 100 or 1,000 amp. at voltages of hundreds of volts may be interrupted.

I claim as my invention:

1. A circuit breaker for periodically interrupting electric current comprising on a common carrier in combination at least one stationary contact, at least one movable contact, a driving shaft, an eccentric mounted on said shaft, a revolvable disc surrounding said eccentric, a pitman member connected to said movable contact and engaging the periphery of said disc, an arm firmly secured to said disc and a pivot designed for rotatably and slidably holding said arm, said pivot being adjustably mounted on said carrier so as to vary the closure period of said two contacts in accordance with variations of the position of said pivot with respect to said carrier.

2. With a multi-phase, periodically operating switching gear for alternating current comprising on a common carrier, a circuit breaker for each phase of the alternating current having a stationary and a reciprocatory contact member, a common drive for actuating said reciprocatory contact members in synchronism with the alternating current, and a connecting member between said common drive and each of said reciprocatory contact members, in combination a device for simultaneously adjusting the position of said connecting members with respect to said stationary contacts so as to thereby vary the duration of the closure periods of said breakers, and spring means disposed between said connecting members and said reciprocatory contact members.

3. A periodically operating circuit breaker for electric circuits comprising on a common carrier in combination a movable contact, at least one stationary contact cooperating with said movable contact, a driving mechanism for producing a reciprocating motion, a connecting member for transmitting said motion from said mechanism to said movable contact, said connecting member being designed to form a rigid connection between said movable contact and said driving mechanism during the opening movement of said movable contact so as to impart a constrained motion to said movable contact, and means for adjusting the mutual position of said stationary contact and said connecting member in order to vary the closure period of the contacts.

4. A periodically operating circuit breaker for electric circuits comprising on a common carrier in combination a movable contact, a stationary contact cooperating with said movable contact, a driving mechanism for producing a reciprocatory motion, a movable connecting member between said driving mechanism and said movable contact, said connecting member being designed to form a rigid connection between said movable contact and said driving mechanism during the opening movement of said movable contact so as to impart a constrained motion to said movable contact, means for adjusting the relative position of said connecting member and said stationary contact, the extent of movement of said connecting member having a greater length than the spacing of said contacts in the open position of the breaker, and a spring arranged between said movable connecting member and said carrier, said spring being designed to balance the difference between the extent of movement of said connecting member and said spacing.

5. A periodically operating circuit breaker for heavy current circuits, comprising on a common carrier in combination a movable contact, at least one stationary contact cooperating with said movable contact, a driving mechanism for producing a reciprocatory motion, said stationary contact being arranged between said movable contact and said mechanism, a movable connecting member of adjustable length between said movable contact and said driving mechanism, said member forming a rigid link between said mechanism and said movable contact during the contact-opening movement so as to impart to said movable contact a positive and constrained motion in the direction away from said mechanism, and a spring arranged between said connecting member and said carrier and tending to move said movable contact towards said mechanism for returning said movable contact to its contact-closing position.

6. A periodically operating circuit breaker for electric circuits, comprising on a carrier a movable contact, a stationary contact cooperating with said movable contact, driving means for producing a reciprocating motion, a connecting member arranged between said movable contact and said driving means and coupled with said driving means so as to positively follow said reciprocating motion, said connecting member having a stop arranged to establish a temporary connection between said connecting member and said movable contact to move said movable contact into its open position, a spring between said connecting member and said movable contact tending to hold said contact against said stationary contact and stop, and means for displacing said stationary contact with respect to said carrier in the direction of movement of said movable contact.

7. A multi-phase converter comprising, in combination, commutating circuit breakers, each having a stationary and a coacting reciprocatory contact member, drive means for actuating said reciprocatory contacts successively in synchronism with the current to be commutated, mechanical adjusting means disposed between said drive means and said contacts for varying the length of the contact periods of the breaker, and means associated with said drive means for shifting the phase position of said contact periods with respect to the voltage cycle of the current to be interrupted.

8. In a heavy-current converter having on a common carrier a mechanism for producing a reciprocatory motion and a contact assembly to be operated by said mechanism, said assembly forming a detachable unit and comprising a supporting body detachably secured to said carrier, a movable contact, a tappet disposed in said body and associated with said movable contact for transmitting said reciprocatory motion from said mechanism to said movable contact, a stationary contact to coperate with said movable contact, means for displacing said stationary contact with respect to said body in the direction of said reciprocatory motion so as to thereby vary the duration of the closing periods of said contacts, and equalizing spring means disposed between said tappet and said movable contact.

9. In a heavy-current converter according to claim 8, said detachable unit also comprising a spring arranged between the aforesaid body and the aforesaid tappet, said spring tending to hold said tappet against the aforesaid mechanism, and an abutment secured to said body and disposed for limiting the movement of said tappet in the direction toward said mechanism.

10. A heavy-current converter comprising a plurality of commutating contact devices with overlapping contact closure periods, each of said devices having in combination a stationary contact, a movable contact, a cam mechanism for producing a reciprocatory motion, said stationary contact being arranged between said movable contact and said cam mechanism, a movable rigid structure linking said movable contact with said mechanism so as to impart to said movable contact a positive and constrained motion in the contact-opening direction away from said mechanism, adjusting means for varying the relative position of said structure and said stationary contact in order to vary the length of said closure periods, and means for actuating said adjusting means during the operation of said mechanism.

11. A heavy-current converter comprising in combination a stationary contact, a movable contact, a cam mechanism for producing a reciprocatory motion, said stationary contact being arranged between said movable contact and said cam mechanism, an intermediate rigid link structure coupled with said cam mechanism and designed to temporarily engage said movable contact so as to form a positive connection between said mechanism and said contact for imparting to said movable contact a constrained motion in the contact-opening direction away from said mechanism, and a spring means arranged externally of said connection and tending to move said movable contact towards said mechanism.

12. A heavy-current converter comprising on a common carrier in combination a stationary contact, a movable contact, a cam mechanism for producing a reciprocatory motion, said stationary contact being arranged between said movable contact and said cam mechanism, a movable rigid member linking said movable contact with said mechanism, said member having a stop for positively engaging said movable contact so as to impart to said movable contact a constrained motion in the contact-opening direction away from said mechanism, return spring-means arranged between said carrier and said member and tending to move said member towards said cam mechanism, and a contact-pressure spring arranged between said member and said movable contact at the side of said movable contact away from said mechanism and tending to hold said movable contact against said stationary contact and said stop.

13. In a heavy-current converter according to claim 12, said link structure being composed of a tappet consisting substantially of metal, and an insulating body integrated with said tappet and forming a stop for positively engaging the aforesaid movable contact member.

14. A heavy-current converter comprising on a common support in combination a movable contact, an eccentric mechanism, a rigid connecting link between said eccentric mechanism and said movable contact for imparting a completely constrained reciprocation to said movable contact, a stationary contact to cooperate with said movable contact, means for securing said stationary contact to said common support, said means being designed to permit said stationary contact a limited movement in the directions of said reciprocation and forming a stop for limiting said movement in the direction toward said movable contact, and a spring tending to hold said stationary contact against said stop.

15. In a heavy-current converter having on a common carrier a mechanism for producing a reciprocatory motion and a plurality of commutating contact assemblies operated by said mechanism, each of said assemblies forming a detachable unit and comprising a supporting body detachably secured to said carrier, a stationary contact mounted on said body, a movable contact to cooperate with said stationary contact, and a tappet disposed in said body and associated with said movable contact and said supporting body and designed for transmitting said reciprocatory motion from said mechanism to said movable contact.

16. A multi-phase circuit breaker for alternating current comprising a commutating device having in each phase a stationary and a movable contact member, drive means connected with said movable contacts for sequentially actuating each of said movable contacts, said drive means including a synchronous motor having a rotatably mounted stator for timely shifting the contact opening and closing periods with respect to the cycle of the current to be interrupted, and mechanical adjusting means disposed between said motor and said contacts for varying the contact opening and closing periods.

17. A heavy-current converter comprising, on a common carrier, in combination, a plurality of commutating interrupters, each of said interrupters having a movable contact, and a stationary contact to cooperate with said movable contact, a cam mechanism for imparting a reciprocatory movement to said movable contacts, and means for simultaneously displacing said stationary contacts with respect to said carrier so as to thereby move said stationary contacts into and out of the operative position.

FLORIS KOPPELMANN.